(12) United States Patent
Jeong et al.

(10) Patent No.: US 7,483,530 B2
(45) Date of Patent: Jan. 27, 2009

(54) APPARATUS FOR SEPARATING BLIND SOURCE SIGNALS HAVING SYSTOLIC ARRAY STRUCTURE

(75) Inventors: Hong Jeong, Pohang (KR); Yong Kim, Pohang (KR)

(73) Assignee: Postech Foundation, Pohang (KR)

( * ) Notice: Subject to any disclaimer, the term of this patent is extended or adjusted under 35 U.S.C. 154(b) by 825 days.

(21) Appl. No.: 10/989,430

(22) Filed: Nov. 17, 2004

(65) Prior Publication Data

US 2006/0095258 A1    May 4, 2006

(30) Foreign Application Priority Data

Aug. 21, 2004   (KR) ...................... 10-2004-0066168

(51) Int. Cl.
*H04M 9/08* (2006.01)
(52) U.S. Cl. .................. 379/406.06; 370/277; 370/352; 375/347; 379/93.09; 455/556.1; 709/229
(58) Field of Classification Search ............ 379/406.06, 379/93.09; 341/155, 172; 342/378; 708/200; 370/277, 352; 375/347; 455/556.1; 709/229
See application file for complete search history.

(56) References Cited

U.S. PATENT DOCUMENTS 4,727,503 A * 2/1988 McWhirter ................. 708/200
5,357,251 A * 10/1994 Morley et al. ............... 341/172
6,127,973 A * 10/2000 Choi et al. .................. 342/378
6,639,537 B1 * 10/2003 Raz ............................ 341/155

\* cited by examiner

*Primary Examiner*—Gerald Gauthier
(74) *Attorney, Agent, or Firm*—Rothwell, Figg, Ernst & Manbeck

(57) ABSTRACT

Disclosed is a hardware architecture receiving multi-input blind source signals and obtaining multi-output. An apparatus for separating blind source signals includes: a forward process unit receiving a plurality of blind source signal vectors and outputting a plurality of output signal vectors by using a predetermined blind source separation algorithm; an update process unit receiving the plurality of output signal vectors and learning first weighting values used for the predetermined blind source separation algorithm according to a predetermined learning algorithm; and a weight process unit having a matrix operation structure for receiving the first weighting values and converting them into coefficients and second weighting values applicable to the predetermined blind source separation algorithm. The forward process unit includes (L+1) identical processing elements connected in a systolic array structure, where L is the number of sequential delay of blind input signal vectors. The update process unit includes $(N^2+N)/2 \times (2L+1)$ identical updating elements connected in a systolic array structure, where N is the number of the blind input signal vectors. Each cost of the processing elements and the updating elements is initialized by 0 in an initial operation stage.

6 Claims, 5 Drawing Sheets

APPARATUS FOR SEPARATING BLIND SOURCE SIGNALS HAVING SYSTOLIC ARRAY STRUCTURE

BACKGROUND OF THE INVENTION

This application claims the priority of Korean Patent Application No. 2004-66168, filed on Aug. 21, 2004, in the Korean Intellectual Property Office, the disclosure of which is incorporated herein in its entirety by reference.

1. Field of the Invention

The present invention relates to a digital signal processing, and more particularly, to hardware having a systolic array structure for separating multiple input blind source signals.

2. Description of Related Art

As electronics is advanced, a variety of techniques for processing digital signals in high speed have been developed. At this time, information digitalization is being progressed to meet the future needs for a multimedia era, and, accordingly, information processing technologies have been continuously developed according to corresponding application fields.

The remarkable development in the digital signal processing allows a digital image/video communication to be widely commercialized so that technologies for processing multimedia and moving pictures are being particularly developed. Unfortunately, since a huge amount of data must be processed to handle image signals, many constraints still exist to efficiently transmit or store the digital image information. Recently, there have been tendencies to integrate Internet, multimedia, and information communication, and, accordingly, the image communication fields are also being integrated and standardized. Also, mixed services of videos, voices, additional information, as well as high quality multimedia are being commercialized.

Meanwhile, many of the image processing techniques are based on a motion compensation inter-frame discrete cosine transform (DCT) algorithm. In the DCT algorithm, image data are converted into coefficient data in a frequency domain, and their energies are concentrated on a low frequency band to convert them to an easily compressible form, so that compression efficiency of a corresponding application system can be significantly improved. Therefore, the DCT algorithm is widely applicable to many kinds of systems requiring data compression such as a high definition television (HDTV). In addition, the size of the image processing apparatus can be minimized, so that miniaturization of application products can be also facilitated.

Subsequently, a variety of techniques have been developed to implement the digital data processing methods such as the DCT algorithm. Such techniques include a distributed arithmetic method, and other methods of using ROMs, typical multipliers, and the like. According to the method of using typical multipliers, a fast algorithm is derived based on a 2-dimensional DCT/IDCT equation. To increase data processing speed in the method of using multipliers, it is important to reduce the number of necessary multiplications or increase the number of concurrent operations.

FIG. 1 is a schematic block diagram for describing a parallel data processing inside hardware.

Since a plurality of processing elements PE1, PE2, . . . , PEn are concurrently operated, processing speed can be increased in comparison with the method in which they are individually operated. Accordingly, the parallel data processing shown in FIG. 1 can be used to increase digital signal processing speed.

The method of using multipliers can be classified into a butterfly structure type and a systolic array structure type. In the butterfly structure, since data must be transmitted to an entire circuit, computation time is long, and the size of the circuit is also large. On the other hand, in the systolic array structure, processing speed of a particular algorithm can be increased by using a parallel processing, and ASIC type hardware is usually employed. Features of the systolic array structure are modularity, regularity, local connectivity, and synchrony.

FIG. 2 is a schematic block diagram illustrating a systolic structure type data processing technique.

As recognized in FIG. 2, input data are processed with interconnectivity. The systolic method has been developed to meet needs in a particular application field such as a signal processing or an image processing, and shows excellent performance and cost-efficiency. In addition, the systolic structure has regularity in a data flow and a control flow, and its components are connected in parallel, so that the control flow and the data flow are iterated in the same path. Accordingly, it is said that the systolic structure is designed to combining features of a pipeline vector processor and an array processor.

Such a systolic structure can be applied to, for example, a blind source separation algorithm for separating blind source signals from the input mixture.

To accommodate a speech recognition system, it is necessary to separate a particular user's voice from other user's voices or background noises. This is because the speech recognition system shows excellent performance during the test in an anechoic room, but its recognition rate is significantly reduced in a real life environment due to noises. The recognition rate of the speech recognition system can be improved by using such a blind source separation method. Furthermore, time consumption for such unnecessary noises can be reduced. Substantial studies for such a blind source separation have been initiated from early 1990's.

However, existing studies on the voice recognition system have been focused on a theoretical investigation on algorithms. Therefore, while software capable of implementing such algorithms has been widely known in the art, hardware implementing them on a chip has been poorly investigated. Needless to say, it is necessary to implement the voice recognition system in hardware in order to accommodate it in our everyday life.

For this reason, there is a need in the art for an apparatus for separating blind source signals that is implemented in hardware.

SUMMARY OF THE INVENTION

The present invention provides hardware capable of separating blind source signals with low cost and low power consumption.

Also, the present invention provides a hardware architecture receiving multi-input blind source signals and obtaining multi-output signals.

According to an aspect of the present invention, there is provided an apparatus for separating blind source signals, comprising: a forward process unit receiving a plurality of blind source signal vectors and outputting a plurality of output signal vectors by using a predetermined blind source separation algorithm; an update process unit receiving the plurality of output signal vectors and learning first weighting values used for the predetermined blind source separation algorithm according to a predetermined learning algorithm; and a weight process unit having a matrix operation structure for receiving the first weighting values and converting them into coefficients and second weighting values applicable to the predetermined blind source separation algorithm, wherein the forward process unit comprises (L+1) identical processing elements connected in a systolic array structure, where L is the number of sequential delay of blind input signal vectors, the update process unit comprises $(N^2+N)/2 \times (2L+1)$ identical updating elements connected in a systolic array structure, where N is the number of the blind input signal vectors, and each cost of the processing elements and the updating elements is initialized by 0 in an initial operation stage.

Preferably, each of the processing elements of the forward process unit may comprise: a first input unit receiving each of the output signal vectors and outputting them with a predetermined delay; a second input unit receiving the second weighting values for multiplying the output signals vectors having the predetermined delay from the weight process unit; a computation unit computing the costs of the processing elements based on outputs of the first input unit and the second input unit according to a predetermined equation; and a control unit adapted to updating costs of predetermined processing elements by using the computed costs.

Preferably, the first input unit and the second input unit may have a first-in-first-out (FIFO) structure, and each of the processing elements may commonly use a single multiplier.

Preferably, each of the updating elements may comprise: a multiplier receiving each component of the output signal vectors and multiplying a result of applying a predetermined function to one of the components of the output signal vectors with remaining components; a register delaying the costs by a predetermined period; and an adder adding outputs of the multiplier to the delayed costs to compute updated costs.

Preferably, the updating elements may be divided into even-numbered updating elements operating in synchronization with even-numbered clocks and odd-numbered updating elements operating in synchronization with odd-numbered clocks.

Preferably, the predetermined function applied to one of the output signal vectors may be a signum function.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
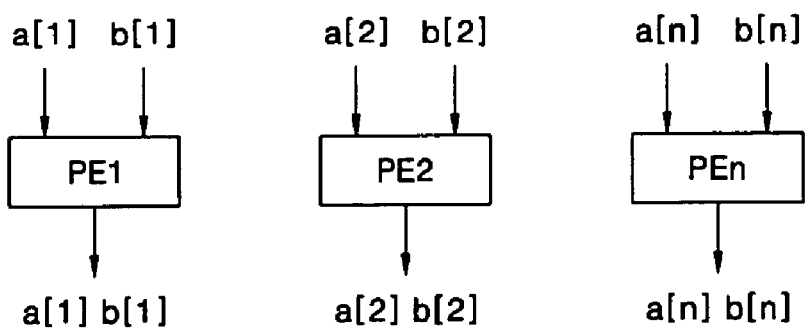
FIG. 1 is a schematic block diagram for describing a parallel data processing in hardware.
Figure 2:
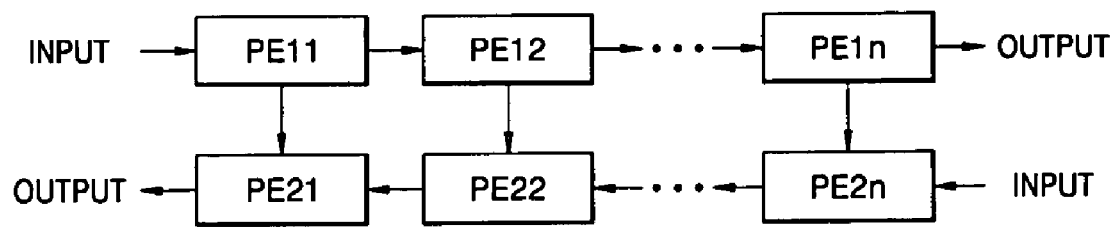
FIG. 2 is a schematic block diagram illustrating a systolic type data processing technique.

The present invention and operational advantages thereof can be fully understood by referring to the accompanying drawings and explanations thereof.

Now, exemplary embodiments of the present invention will be described with reference to the accompanying drawings to explain the present invention in detail. In the drawings, the same reference numerals indicate the same elements.

Figure 3:
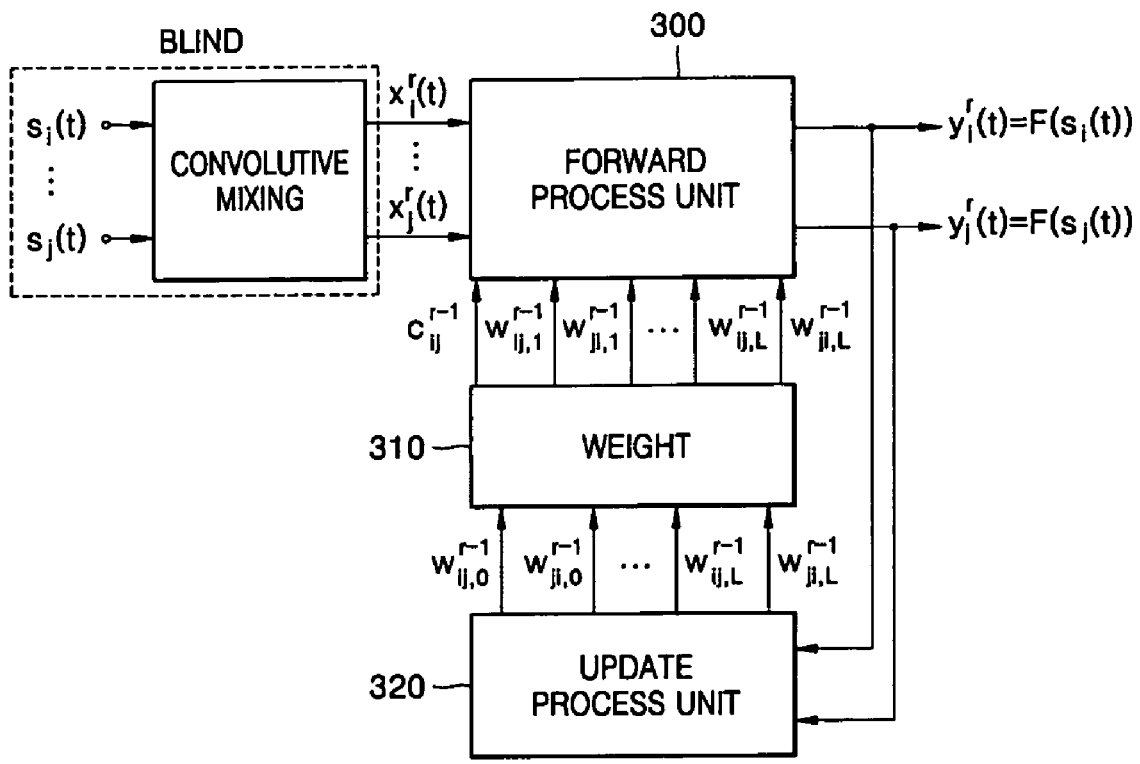
FIG. 3 is a schematic block diagram conceptually illustrating an apparatus for separating blind source signals according to an embodiment of the present invention.

FIG. 3 is a schematic block diagram conceptually illustrating an apparatus for separating blind source signals according to an embodiment of the present invention, which includes a forward process unit 300, a weight process unit 310, and an update process unit 320.

Basically, the forward process unit 300 receives n input signal vectors $x_{ir}(t), \ldots, x_{jr}(t)$ based on Equation 3, which will be described below, and obtains n output signal vectors $y_{ir}(t), \ldots, y_{jr}(t)$ by multiplying the received input signal vectors $x_{ir}(t), \ldots, x_{jr}(t)$ by second weight values. The update process unit 320 obtains first weight values by using an expanded Herault-Jutten method as shown in Equation 7, which will be described below.

On the other hand, the weight process unit 310 computes the first weight values, which have been obtained in the update process unit 320, again to obtain the second weight values actually applicable to the forward process unit 300. The above processes are repeated until the weight values are converged. In FIG. 3, the subscript r denotes a current value, and the subscript r-1 denotes a previous value.

The blind source separation algorithm applied to FIG. 3 is a feedback network algorithm.

The blind source separation (BBS) refers to a method of recovering original signals from a mixture when individual blind source signals are mixed without a priori knowledge of those signals. This kind of method has been widely investigated by those skilled in the art after the fact that signals can be easily separated by using a method proposed by Jutten and Herault in 1991 was disclosed.

According to the present invention, a gradient descent method, a feedback network and learning algorithm proposed by K. Torkkola, is used to separate independent signals from a convolutive mixture. Therefore, an expanded Herault-Jutten method, proposed by T. Nomura, having a fast parallel operation scheme can be applied to the present invention.

A hardware architecture for implementing the expanded Herault-Jutten method typically includes a forward process feedback network and an update feedback network. Since both networks are simple and designed to connect processing elements PE and updating elements UE in parallel, they are highly efficient and appropriate to facilitate a real time blind source separation.

Now, we will discuss a blind source separation algorithm according to an embodiment of the present invention.

Mixiing Model

First, before initiating the blind source separation, we consider a mixing model in which independent signals are convolutively mixed and input through a microphone. Specifically, it is assumed that voice signals input through a microphone are independent from each other, and voice signals directly input without delay are mixed with those reflected by walls with delay. It is apparent that such an assumption is to model our everyday life and not to limit technical fields of the present invention. Letting $s(t)=[s_1(t),$ $s_2(t), \ldots, s_n(t)]^T$ denotes real voice data vectors and $x(t)=[x_1(t), x_2(t), \ldots, x_m(t)]^T$ denotes input signal vectors through a microphone, we can obtain Equation 1 as follows.

$$x_i(t) = \sum_p \sum_{j=0}^{n} h_{ij,p}(t) s_j(t-p), \quad i = 1, 2, \ldots, m \quad \text{[Equation 1]}$$

where, $h_{ij,p}$ denotes a room impulse response of a jth voice and an ith microphone. Herein, the number of voice data vectors should be larger than the number of microphones (i.e., m>n). If a z-transform is applied to Equation 1 letting n=2, we can obtain Equation 2 as follows.

$$X_1(z) = S_1(z) + H_{12}(z) S_2(z),$$

$$X_2(z) = H_{21}(z) S_1(z) + S_2(z) \quad \text{[Equation 2]}$$

Forward Process of Feedback Network

Next, we will discuss an algorithm for separating blind source signals from a convolutive mixture by using a feedback network. Limiting delay of the input signals to the Lth signal and letting $y_i(t)$ denotes the ith output of the feedback network, we can obtain Equation 3 as follows.

$$y_i(t) = x_i(t) + \sum_{p=0}^{L} \sum_{j \ne i}^{n} w_{ij,p}(t) y_j(t-p), \quad i, j = 1, 2, \ldots, n \quad \text{[Equation 3]}$$

where, $w_{ij,p}$ denotes a weight value of $y_i(t)$ and $y_j(t-p)$. If Equation 3 is represented in a matrix form, we can obtain Equation 4 as follows.

$$\vec{y_i}(t) = \vec{x_i}(t) + \sum_{p=0}^{L} \overrightarrow{W_p}(t) \vec{y_i}(t-p), \quad \text{[Equation 4]}$$

$$= [\vec{I} - \overrightarrow{W_0}]^{-1} \left\{ \vec{x}(t) + \sum_{p=1}^{L} \overrightarrow{W_p}(t) \vec{y}(t-p) \right\}$$

For a convenient description, if z-transform is applied to Equation 4 letting n=2, we can obtain Equation 5 as follows.

$$Y_1(z) = X_1(z) + W_{21}(z) Y_2(z),$$

$$Y_2(z) = X_2(z) + W_{12}(z) Y_1(z) \quad \text{[Equation 5]}$$

Figure 4:
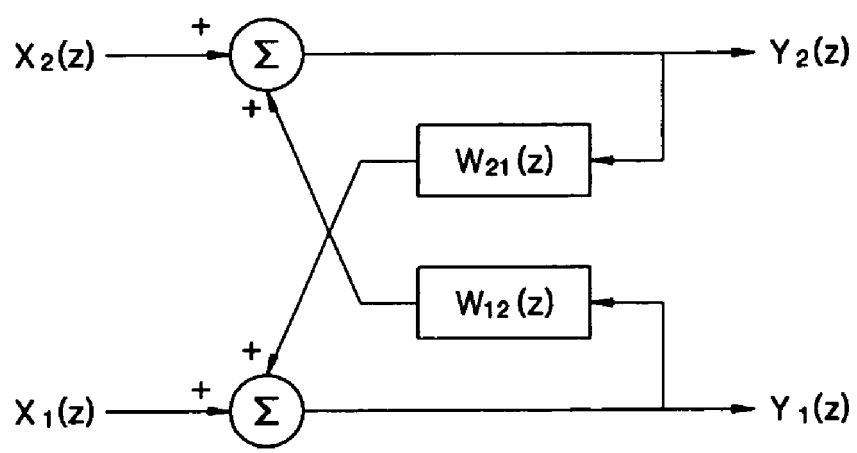
FIG. 4 is a schematic block diagram for describing a blind source separation algorithm according to the present invention.

The result of Equation 5 can be implemented in hardware as shown in FIG. 4. In the feedback network algorithm shown in FIG. 4, input signal vector components $X_1(z)$ and $X_2(z)$ are input to a corresponding adder and output signal vector components $Y_1(z)$ and $Y_2(z)$ are computed by using the feedback network with weighting values $W_{21}(z)$ and $W_{12}(z)$.

In FIG. 4, supposing voice signals have been completely separated by using the feedback network, a relation Y(z)=S(z) can be satisfied. Therefore, the weighting values can satisfy the following Equation 6 according to Equations 2 and 5.

$$W_{12}(z) = -H_{12}(z),$$

$$W_{21}(z) = -H_{21}(z) \quad \text{[Equation 6]}$$

As a result, the weighting values can be obtained by computing H(z). However, we still can not identify H(z) because it is impossible to know how voices are mixed. Therefore, we should obtain the weighting values W(z) by using a learning algorithm assuming that the voice signals are independent from each other. Now, the learning algorithm used in an apparatus for separating blind source signals according to an embodiment of the present invention will be described.

Update Process of Feedback Network

According to the Jutten-Herault algorithm, the learning algorithm is accomplished by assuming that the voice signals are not convolutively mixed but instantaneously mixed. On the contrary, according to the expanded Jutten-Herault algorithm described above, the learning algorithm is accomplished by assuming that the voice signals are convolutively mixed.

Thus, the learning algorithm for the weighting values W can be represented by the following Equation 7.

$$\overrightarrow{W_D}(t) = \overrightarrow{W_D}(t-1) + \eta_t f(\vec{y}(t)) \vec{y}^T(t-p) \quad \text{[Equation 7]}$$

where, $\eta_t$ denotes a constant representing a learning rate.

Figure 7:
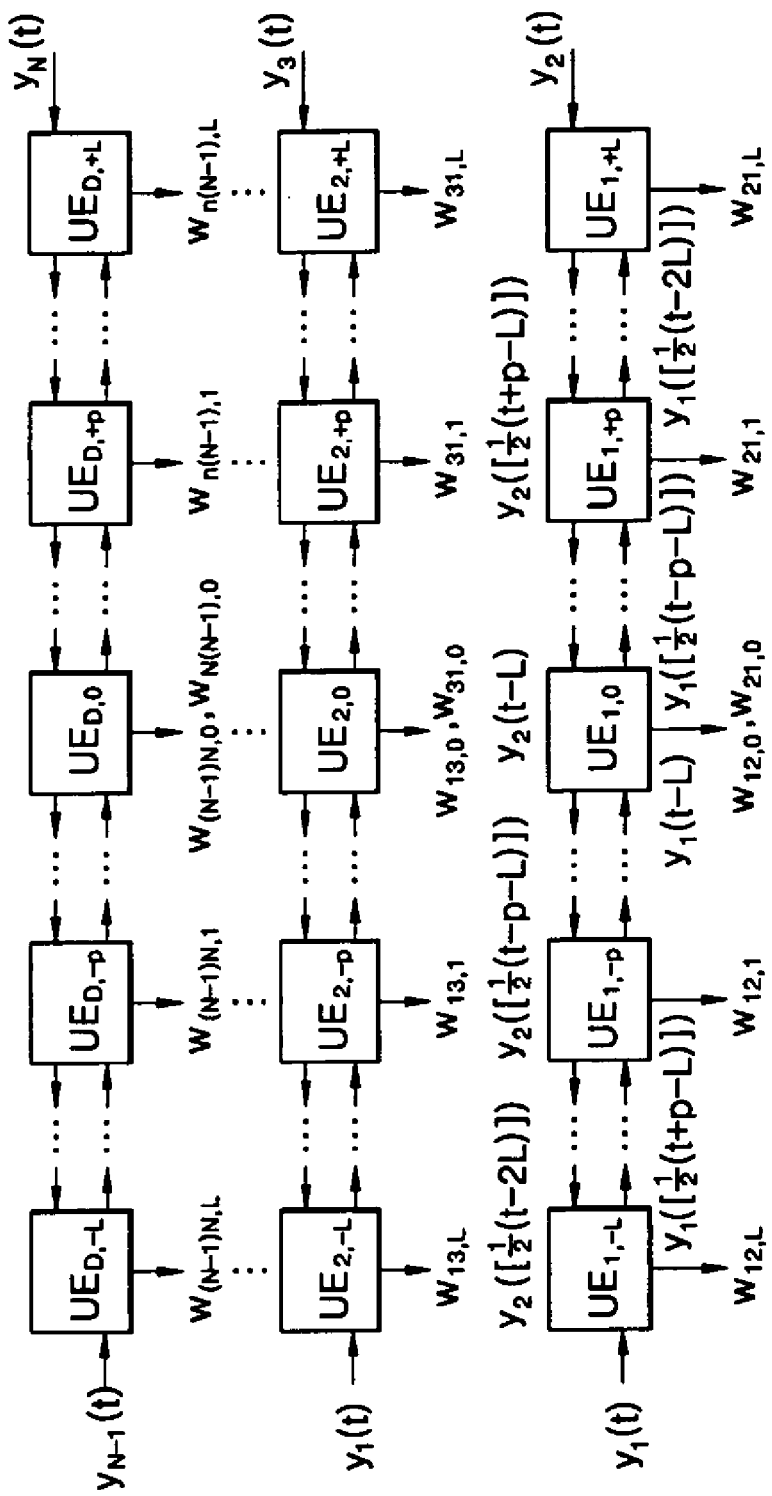
FIG. 7 is a schematic block diagram for describing operation of an update process unit included in an apparatus for separating blind source signals according to an embodiment of the present invention.

As recognized in FIG. 7, when a correlation value between the variants $f(\vec{y}(t))$ and $\vec{y}^T(t-p)$ is equal to 0, the learning algorithm can be converged. The correlation value equal to 0 means that dependence between the output signals $y_i(t)$ and $y_j(t)$ is minimized and thus two signals are independent from each other.

In addition, the function f(•) in Equation 7 may be a nonlinear function. In an apparatus for separating blind source signals according to an embodiment of the present invention, the function f(•) may be preferably a signum function $f(y_i(t)) = \text{sign}(y_i(t))$ or a hyperbolic tangent function $f(y_i(t)) = \tanh(y_i(t))$. In this example, a signum function is employed because it can be implement by a simple structure in hardware according to the present invention.

Now, a structure for implementing the feedback network algorithm described above in hardware will be described in detail.

Entire Architecture

FIG. 3 is a schematic block diagram conceptually illustrating an apparatus for separating blind source signals according to an embodiment of the present invention, which includes a forward process unit 300, a weight process unit 310, and an update process unit 320. The voice signals $S_1(t), S_2(t), \ldots, S_n(t)$ to be separated have been convolutively mixed before input to microphones $X_1(t), X_2(t), \ldots, X_n(t)$.

Basically, the forward process unit 300 receives n input signal vectors $x_{ir}(t), \ldots, x_{jr}(t)$ based on Equation 3, which will be described below, and obtains n output signal vectors $y_{jr}(t), \ldots, y_{jr}(t)$ by multiplying the received input signal vectors $x_{ir}(t), \ldots, x_{jr}(t)$ by weighting values. The update process unit 320 obtains first weight values by using the expanded Herault-Jutten method as shown in Equation 7, which will be described below. On the other hand, the weight process unit 310 computes the first weighting values, which have been obtained in the update process unit 320, again to obtain the second weighting values actually applicable to the forward process unit 300. The above processes are repeated until the weighting values are converged. In FIG. 3, the subscript r denotes a current value, and the subscript r-1 denotes a previous value.

Hardware Architecture of Forward Process

Figure 5:
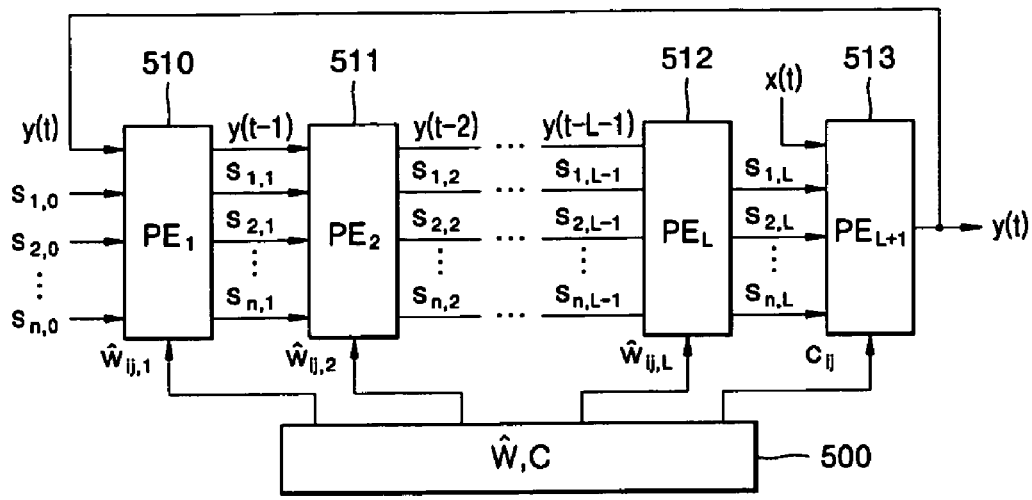
FIG. 5 is a schematic block diagram for describing operation of a forward process unit included in an apparatus for separating blind source signals according to an embodiment of the present invention.

FIG. 5 is a schematic block diagram for describing operation of the forward process unit 300 included in an apparatus for separating blind source signals according to an embodiment of the present invention. A reference numeral 500 denotes the weight process unit shown in FIG. 3. For a convenient description, Equation 4 can be rearranged as follows.

$$\vec{y_i}(t) = \vec{x_i}(t) + \sum_{p=0}^{L} \overrightarrow{W_p}(t)\overrightarrow{y_j}(t-p), \quad \text{[Equation 8]}$$

$$= [\vec{I} - \overrightarrow{W_0}]^{-1}\left\{\vec{x}(t) + \sum_{p=1}^{L} \overrightarrow{W_p}(t)\vec{y}(t-p)\right\}$$

In Equation 8, if n denotes the number of input vectors and $c_{ij}$ denotes elements, letting $\overline{C}=[\overline{I}-\overline{W_0}]^{-1}$, Equation 8 can be represented as follows.

$$\vec{y}(t) = \vec{C}\left\{\vec{x}(t) + \sum_{p=1}^{L} \overrightarrow{W_p}\vec{y}(t-p)\right\}, \quad \text{[Equation 9]}$$

$$= \vec{C}\vec{x}(t) + \sum_{p=1}^{L} \overrightarrow{CW_p}\vec{y}(t-p)\},$$

$$= \vec{C}\vec{x}(t) + \sum_{p=1}^{L} \widehat{\overrightarrow{W}}_p\vec{y}(t-p)$$

Further, Equation 8 can be rearranged by using Equation 9 as follows.

$$y_i(t) = \sum_{j=1}^{n} c_{ij}x_j(t) + \sum_{p=1}^{L}\sum_{j=1}^{n} \hat{w}_{ij,p}(t)y_j(t-p), \quad \text{[Equation 10]}$$

for $i = 1, 2, \ldots, n$.

Finally, the forward process unit 300 is designed to implement Equation 10.

On the other hand, the weight process unit 310 computes the coefficient $\overline{C}=[\overline{I}-\overline{W_0}]^{-1}$ and the second weighting value $\overline{W}=\overline{CW}$. Since a typical matrix operation is used in this case and such an operation is well known to those skilled in the art, its descriptions will not be given herein.

To describe a hardware architecture of the forward process unit 300, costs of the processing elements of the forward process unit 300 are defined as follows.

$$f_{i,p}(t) \equiv f_{i,p-1}(t) + \sum_{j=1}^{n} \widehat{w}_{ij,p}(t)y_j(t-p), \quad \text{[Equation 11]}$$

for $p = 1, 2, \ldots, L \quad f_{i,0}(t) = 0$.

Equation 10 can be rearranged by using Equation 11 as follows.

$$y_i(t) = \sum_{j=1}^{n} c_{ij}x_j(t) + f_{i,L}(t), \quad \text{for } i = 1, 2, \ldots, n \quad \text{[Equation 12]}$$

The architecture used in FIG. 3 has a parallel array structure for the forward processing with (L+1) processing elements (PE). All of the processing elements have a simple and identical structure, and they are connected with neighboring ones in parallel. Therefore, such a structure gives advantages in that the number of processing elements can be increased depending on the size of the corresponding chip and thus performance can be improved. This is because the larger number of processing elements gives opportunity to consider the larger delay time for the voice sources.

Referring to FIG. 5, for p=1, 2, ..., L, each pth processing element receives $y_i(t-p)$, $\hat{w}_{ij,P}$, and $f_{i,p-1}$ (t) from the previous processing element and then computes each cost $f_{i,p}(t)$ by using Equation 11 to output the result to the next processing element. The last (L+1)th processing element $PE_{L+1}$ receives x(t) and $c_{ij}$ as shown in Equation 10 and computes the output y(t). In this manner, Equation 10 can be implemented in hardware by defining the costs of the processing elements based on Equation 11 and repeating computation of them.

Figure 6:
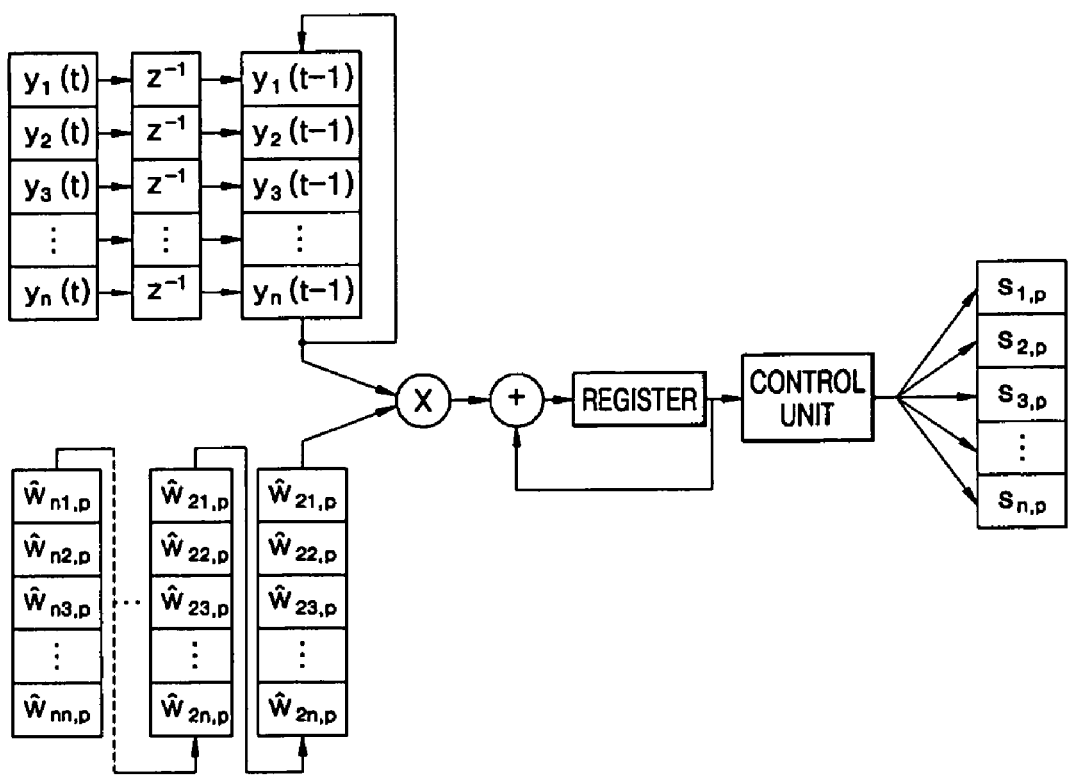
FIG. 6 is a schematic block diagram for describing operation of one of processing elements included in a forward process unit shown in FIG. 5.

FIG. 6 is a schematic block diagram illustrating an internal structure of a processing element shown in FIG. 5. The internal of each element includes a signal input unit, a weight input unit, a computation unit, and a control unit. The signal input unit receives y(t) from the previous processing element and then obtains y(t−1) by using registers to output the results to the computation unit and the next processing element. The weight input unit sends the weighting values learned from an update process unit to the computation unit. The update process unit will be described with reference to FIG.7. At this point, both input units are organized with a first-in-first-out (FIFO) queue structure to sequentially output the input values and the weighting values to the computation unit. In addition, since the number of y(t) should be matched with the number of weighting values, its input operation is accomplished N times as shown in the drawing. The computation unit includes a multiplier, an adder, and a register to perform the computation according to Equation 11. Since the multiplier is a complex machine to implement in hardware and has a huge number of gates, a single multiplier is iteratively used. The control unit updates the result of the computation unit to output them to a corresponding processing element, and resets the registers of the computation unit in each nth time.

Hardware Architecture of Update Process

Now, we will discuss a hardware architecture for the weighting value learning in the above description. The architecture used in this section also has a structure in which the processing elements implementing the same operation as the forward process unit are connected in parallel. To distinguish from the processing elements of the forward process unit, the processing elements of the update process unit will be referred to as "updating elements".

First of all, Equation 7 can be rearranged as follows.

$$\begin{cases} w_{ij,p}(t) = w_{ij,p}(t-1) - \eta, \, f(y_i(t))y_j(t-p), \\ w_{ji,p}(t) = w_{ji,p}(t-1) - \eta, \, f(y_j(t))y_i(t-p). \end{cases} \quad \text{[Equation 13]}$$

$i, j = 1, 2, \ldots, n$

FIG. 7 is a schematic block diagram for describing operation of the update process unit included in an apparatus for separating blind source signals according to an embodiment of the present invention.

Supposing n is the number of signals to be separated, the number of columns, D, can be expressed as $(n^2+n)/2$, and the number of rows becomes L which also represents delay. The update process unit has a simple structure similar to the forward process unit shown in FIG. 3, and the updating elements are connected in parallel with the neighboring ones.

In addition, the updating elements (UE) are designed such that even-numbered ones are operated in even-numbered times and odd-numbered ones are operated in odd-numbered times. Meanwhile, the costs of the updating elements can be defined as follows.

for p>=0

$$u_{d,p}(t)=u_{d,p}(t-1)-\eta_d f(y_i[\tfrac{1}{2}(t-p-L)]))y_j([\tfrac{1}{2}(t+p-L)]),$$

for p<0

$$u_{d,p}(t)=u_{d,p}(t-1)-\eta_d f(y_j[\tfrac{1}{2}(t-p-L)]))y_i([\tfrac{1}{2}(t+p-L)]),$$

d=1,2,..., D [Equation 14]

where, [x] denotes a largest integer not exceeding x.

The resulting costs of the updating elements are updated by using the weighting values as follows.

for p=-L, ..., -2,-1

$$w_{ij,p}(t)=u_{d,p}(t)$$

for p=0

$$w_{ij,o}(t)=w_{ij,o}(t)=u_{d,o}(t)$$

for p=1,2, ... L $$w_{ij,p}(t)=u_{d,p}(t)$$ [Equation 15]

Figure 8:
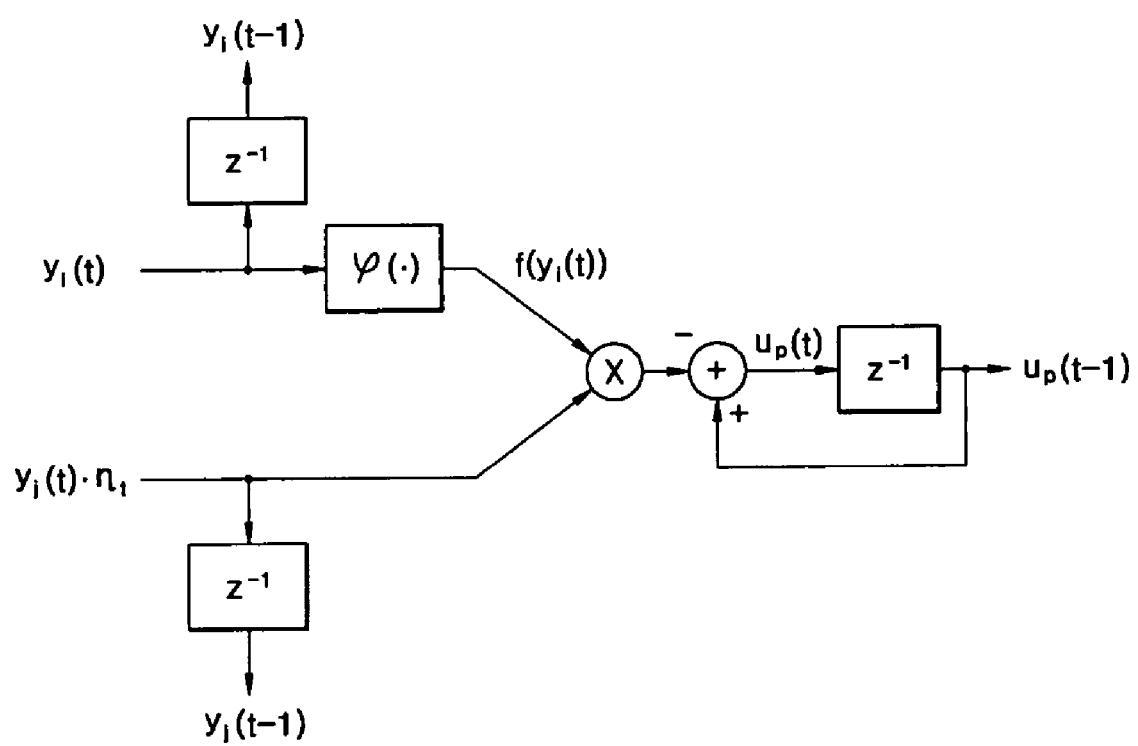
FIG. 8 is a schematic block diagram for describing operation of one of updating elements included in an update process unit shown in FIG. 7.

FIG. 8 is a schematic block diagram for describing operation of one of the updating elements included in an update process unit shown in FIG. 7. For example, when $y_i=y_1([\tfrac{1}{2}(t-p-L)]$ and $y_j=y_2([\tfrac{1}{2}[t+p-L])$ are input, one of them are input to a function, e.g., $f(y_1([\tfrac{1}{2}(t-p-L)]))=\text{sign}(y_1([\tfrac{1}{2}(t-p-L)]))$, where sign denotes a signum function. Therefore, if $y_1([\tfrac{1}{2}(t-p-L)])$ is a positive value, the signum function outputs 1, and otherwise outputs −1. As a result, a multiplication of $y_2([\tfrac{1}{2}(t+p-L)])$ will only change the sign. The result of the computation will be used to update the previous costs of the updating elements.

According to the present invention, it is possible to separate blind source signals by using an optimal algorithm or a hardware architecture developed based on ASIC or FPGA based chip technologies with low power consumption and low cost.

In addition, it is possible to provide a multi-input and multi-output hardware architecture capable of separating blind source signals as a preprocessing section of a voice recognition system.

While the present invention has been particularly shown and described with reference to exemplary embodiments thereof, it will be understood by those skilled in the art that various changes in form and details may be made therein without departing from the spirit and scope of the present invention as defined by the appended claims. For example, the present invention has been described with respect to voice signals, but is not intended to limit the scope of the invention by this. Rather, an algorithm or a hardware device according to the present invention can be employed in all other applications relating to a blind source separation technique.

Therefore, the whole scope of the present invention should be determined by the technical concept represented in the appended claims.

What is claimed is:

1. An apparatus for separating blind source signals, comprising:

a forward process unit receiving a plurality of blind source signal vectors and outputting a plurality of output signal vectors by using a predetermined blind source separation algorithm;

an update process unit receiving the plurality of output signal vectors and learning first weighting values used for the predetermined blind source separation algorithm according to a predetermined learning algorithm; and a weight process unit having a matrix operation structure for receiving the first weighting values and converting them into coefficients and second weighting values applicable to the predetermined blind source separation algorithm, wherein the forward process unit comprises (L+1) identical processing elements connected in a systolic array structure, where L is the number of sequential delay of blind input signal vectors, the update process unit comprises $(N^2+N)/2.\text{times}.(2L+1)$ identical updating elements divided into even-numbered updating elements operating in synchronization with even-numbered clocks and odd-numbered updating elements operating in synchronization with odd-numbered clocks and connected in a systolic array structure, where N is the number of the blind input signal vectors, and each cost of the processing elements and the updating elements is initialized by 0 in an initial operation stage.

2. The apparatus for separating blind source signals according to claim 1, wherein each of the processing elements of the forward process unit comprises: a first input unit receiving each of the output signal vectors and outputting them with a predetermined delay; a second input unit receiving the second weighting values for multiplying the output signals vectors having the predetermined delay from the weight process unit; a computation unit computing the costs of the processing elements based on outputs of the first input unit and the second input unit according to a predetermined equation; and a control unit adapted to updating costs of predetermined processing elements by using the computed costs.

3. The apparatus for separating blind source signals according to claim 2, wherein the first input unit and the second input unit have a first-in-first-out (FIFO) structure.

4. The apparatus for separating blind source signals according to claim 3, wherein each of the processing elements commonly uses a single multiplier.

5. The apparatus for separating blind source signals according to claim 1, wherein each of the updating elements comprises:

a multiplier receiving each component of the output signal vectors and multiplying a result of applying a predetermined function to one of the components of the output signal vectors with remaining components; a register delaying the costs by a predetermined period; and an adder adding outputs of the multiplier to the delayed costs to compute updated costs.

6. The apparatus for separating blind source signals according to claim 5, wherein the predetermined function applied to one of the output signal vectors is a signum function.

* * * * *